3,398,587
COMBINED HITCH AND POWER TRAIN
COUPLING ASSEMBLY FOR TRACTORS
Frank M. Martin, Glen Ellyn, Ill., assignor to International Harvester Company, Chicago, Ill., a corporation of Delaware
Filed June 28, 1967, Ser. No. 649,650
10 Claims. (Cl. 74—15.63)

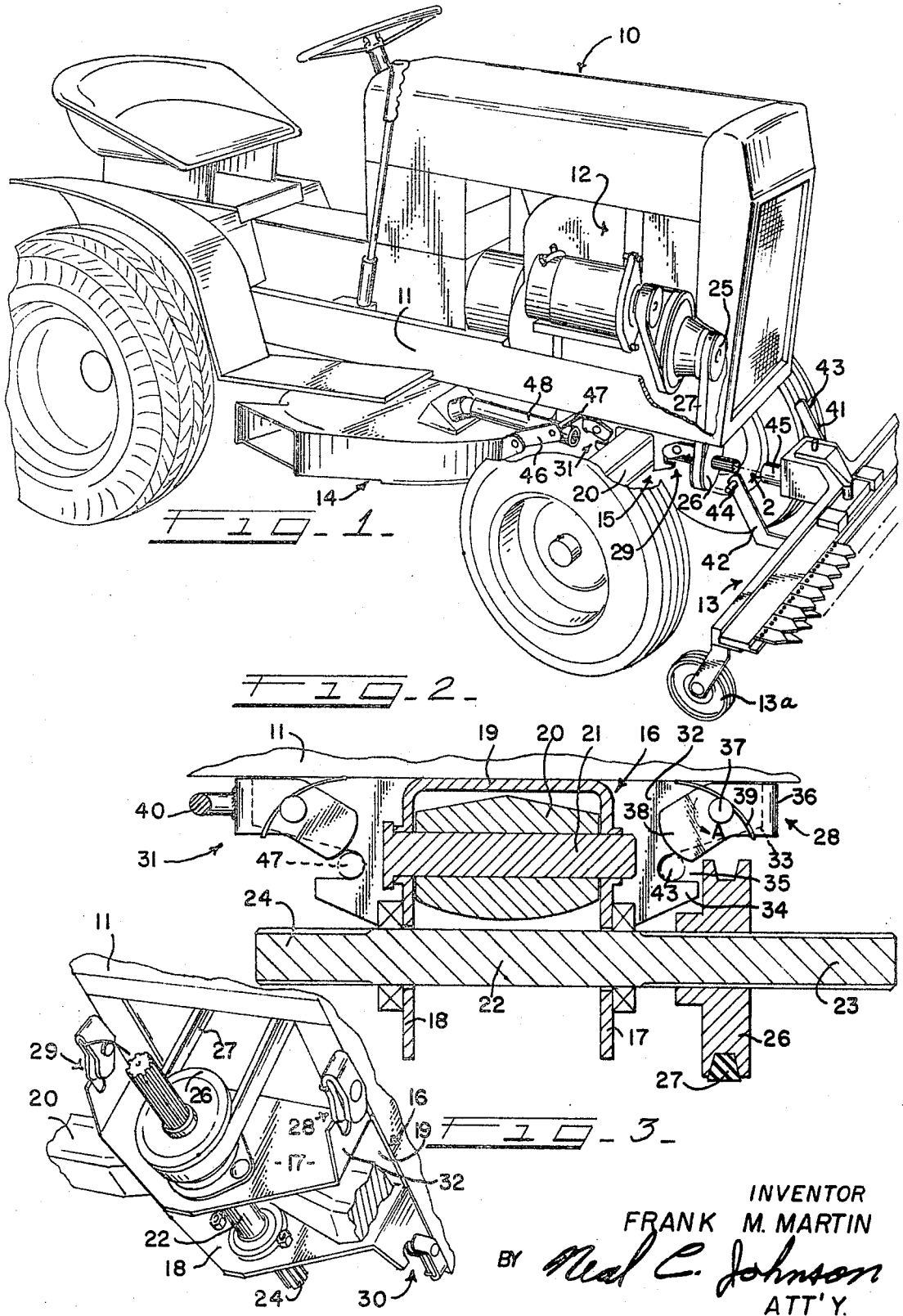
Aug. 27, 1968     F. M. MARTIN     3,398,587
COMBINED HITCH AND POWER TRAIN COUPLING ASSEMBLY FOR TRACTORS
Filed June 28, 1967
INVENTOR
FRANK M. MARTIN
BY Neal C. Johnson
ATT'Y.

ABSTRACT OF THE DISCLOSURE

An assembly secured to the underside of a tractor and including a power take-off shaft adapted to be driven by a belt and pulley drive from the engine of the tractor. The PTO shaft has forwardly and rearwardly extending power-output ends. The assembly includes forwardly and rearwardly extending implement-receiving hitches disposed proximate to the respective power-output ends of the PTO shaft enabling implements to be coupled to the respective hitches coincident with coupling of the implements to the respective ends of the PTO shaft.

Background of the invention (1) *Field of the invention.*—The invention relates generally to tractor and implement coupling means and more particularly to an assembly by which implements and power drive means therefor may be coupled to a tractor.

(2) *Description of the prior art.*—In recent years even the so-called garden type tractor has become increasingly sophisticated in design and may represent a considerable investment in cost. Consequently efforts have been made to design these and larger tractors to accommodate an increasing number of implements for accomplishing a wider variety of tasks. The desired full utilization of the tractor is more readily accomplished if the various implements can be quickly and easily coupled to and uncoupled from the tractor.

The increasing use of power driven implements has created a problem in the manner in which the drive or power train may be coupled to the power source of the tractor in conjunction with coupling the implement itself to the tractor. Particularly in the case of small garden type tractors, the implements are often driven through belt and pulley arrangements connected between the tractor and the implement. Such drive arrangements are cumbersome and difficult to install. Moreover this type of drive arrangement frequently requires alignment and adjustment during the course of operation.

The use of power take-off shafts has been recognized as a means for eliminating the belt and pulley drives. However, the problem remains of coordinating the attachment of the implement to the tractor and coupling the power drive portion of the implement to the PTO shaft so that the total time and effort involved may be substantially reduced.

Summary

The invention relates to a combination plural hitch and power train coupling assembly for a tractor and includes a support adapted to be mounted on the underside of the tractor. A PTO shaft is mounted on the support and terminates in forwardly and rearwardly extending power-output ends. The PTO shaft is adapted to be driven from the engine of the tractor through suitable interconnecting drive means.

The assembly further includes hitch means on the support by which associated implements may be coupled to the tractor. The hitch means are disposed proximate to the respective power-output ends of the PTO shaft and serve to align power train portions of the implements with the respective power-output ends of the PTO shaft attendant to coupling the implements to the hitch means.

The assembly of the invention greatly facilitates rapid attachment of implements to the tractor along with coupling the power train portions of the implements to the PTO shaft of the assembly. Moreover, the assembly permits attachment of implements to the tractor in longitudinally spaced relation thereof by virtue of the provision of hitch means proximate to both power-output ends of the PTO shaft.

The assembly of the invention is further characterized by a rugged and compact design which does not interfere with normal operation of the tractor.

Brief description of the drawings

FIGURE 1 is a fragmentary perspective view of a tractor and associated power driven implements in position to be attached to the tractor by means of the assembly of the invention;

FIGURE 2 is a fragmentary vertical section view of the assembly of the invention taken in the direction of arrow 2 of FIGURE 1; and FIGURE 3 is a fragmentary perspective view of the assembly of the invention.

Description of the preferred embodiment

Referring first to FIGURE 1 there is shown a tractor 10 having a longitudinal frame assembly 11 and an engine 12 mounted proximate to the forward end of the tractor. A first implement such as a sickle-type mower, for example, is shown generally at 13 positioned forwardly of the tractor for attachment thereto. A second implement such as a rotary mower, for example, is shown generally at 14 positioned beneath the tractor 10 and rearwardly of the sickle mower 13 for attachment to the tractor. It will be understood that the sickle-type mower 13 and rotary mower 14 are illustrative examples of implements which can be attached to the tractor and need not be described in detail.

Generally, the mower 13 is of the center drive type and may include a pair of wheels (one of which being shown at 13a) for supporting the mower above the ground for cutting tall grass at a substantial distance above the ground. The mower 14 is of the rotary cutter-blade type for cutting the grass near the ground. Accordingly, the implements 13 and 14 are capable of concurrent use when coupled to the tractor 10 by means to be described.

In accordance with the invention, a combination plural hitch and power train coupling assembly is shown generally at 15 secured to the underside of the frame 11 proximate to the forward end thereof. As shown in FIGURES 2 and 3, the assembly 15 includes a support member 16 which includes a pair of parallel plate portions 17 and 18 interconnected by a top plate portion 19 to form a channel-shaped structure extending transversely of the frame 11 of the tractor.

In the illustrated embodiment of the invention, the channel structure of the support 16 accommodates the front axle 20 of the tractor. As shown in FIGURE 2 the axle 20 is coupled between the plate portions 17 and 18 by means of a pivot pin 21.

As best shown in FIGURES 2 and 3 a PTO shaft 22 is journaled through the plate portions 17 and 18 of the support member 16 and extends parallel to the longitudinal axis of the tractor 10. The shaft 22 is mounted beneath the axle 20 and terminates in forwardly and rearwardly extending power-output ends 23 and 24 respectively. The shaft ends 23 and 24 are preferably splined as shown.

The PTO shaft 22 is adapted to be driven from the tractor engine 12 which includes a front mounted power-output pulley 25 rotatable about a horizontal axis parallel to the longitudinal extent of the tractor and the longitudinal extent of the shaft 22. A pulley 26 is mounted on the shaft 22 forwardly of the frontmost plate portion 17 and beneath the engine pulley 25. A flexible drive belt 27 of the V-type is trained about the pulleys 25 and 26 as shown for drivingly interconnecting the same.

In accordance with an important feature of the invention, the assembly includes plural hitch means disposed proximate to the respective plural power-output ends of the PTO shaft 22 of the assembly. As best shown in FIGURE 3 the hitch means includes a pair of implement-receiving socket assemblies 28 and 29 extending forwardly from opposite ends respectively of the frontmost plate portion 17 of the shaft end 23. Similarly a pair of implement-receiving socket assemblies 30 and 31 extend rearwardly from opposite ends respectively of the rearmost plate portion 18 proximate to the rearwardly extending shaft end 24.

Each of the socket assemblies 28 through 31 is substantially identical in construction and therefore a description of one will suffice for all. With reference to FIGURES 2 and 3 the socket assembly 28 includes a flange 32 extending at right angles from the plate portion 17. In practice the flange 32 is formed integrally with the plate portion 17 and is simply bent at right angles with respect thereto. As best shown in FIGURE 2 the flange 32 includes upper and lower portions 33 and 34 respectively which are vertically spaced to define an open-ended slot 35 therebetween.

Each of the socket assemblies 28 through 31 includes latch means for purposes to be described. The latch means includes a lock member 36 pivotally coupled to the upper portion 33 by means of a pin 37. The lock member 36 is preferably U-shaped as viewed in plan so as to have identical portions disposed on opposite sides of the flange 32 as shown. As best shown in FIGURE 2 the lock member 36 includes a downwardly inclined portion 38 extending at least partially across the slot 35 when pivoted in the position shown.

A spring 39 is wound a few turns around the pin 37 and terminates in one end bent under the lock member 36 and the other end bearing against the underside of the frame assembly 11. The spring 39 tends to pivot the lock member 36 about the pin 37 in the direction of arrow A in FIGURE 2. The engagement of the top edge of the lock member 36 against the underside of the frame assembly 11 retains the lock member in the position shown.

In the illustrated embodiment of the invention the respective lock members of the rearwardly disposed socket assemblies 30 and 31 may be interconnected by a transverse bar 40. Accordingly the lock members are pivotable in unison.

As mentioned above, the sickle-type mower 13 and rotary mower 14 are examples of implements which can be attached to the tractor for powered operation thereby. In the example shown the sickle-type mower 13 may include a pair of linkage arms 40 and 41 extending upwardly and rearwardly therefrom. Mounting pins 43 and 44 extend laterally from the ends of the arms 41 and 42 respectively. The mower 13 also includes a drive shaft coupling 45 forming a part of the power train mechanism of the mower.

The rotary mower 14 may include a pair of parallel upwardly and forwardly extending linkage arms (one of which being shown at 46 in FIGURE 1) which may be interconnected by a laterally extending rod 47. The mower 14 also includes a drive shaft coupling 48 forming a part of the power train mechanism of the mower.

*Operation*

With the assembly of the invention installed as shown, the operation of the invention will be readily understood. The mounting pins 43 and 44 of the implement 13 are disposed for coupling with the respective socket assemblies 28 and 29. This attachment may be accomplished by simply moving the tractor forwardly to position the pins 43 and 44 in the respective implement-receiving slots of the socket assemblies. As the pins move into the slots the lock member 36 of each socket assembly is cammed and pivoted oppositely to the direction of arrow A in FIGURE 2 against the biasing force of the spring 39. As the pin 43, for example, reaches the dotted line position shown in FIGURE 2, the lock member 36 pivots in the direction of the arrow A to thus secure the pin in the socket assembly.

By virtue of the above described attachment operation, the drive shaft coupling 45 will be aligned with the end 23 of the PTO shaft 22 to facilitate rapid intercoupling of the same.

Briefly, the implement 14 may be attached to the assembly of the invention in substantially the same manner as above described. The implement may be moved forwardly to position the rod 47 in the implement-receiving slots of the socket assemblies 30 and 31. Concurrently the drive shaft coupling 48 will be aligned with the shaft end 24 facilitating intercoupling of the same.

The implements may be detached from the tractor by pivoting the respective lock members 36 so that the inclined portion 38 is disposed above the slot 35. The implements may then be removed from the socket assemblies upon uncoupling the drive shaft couplings from the ends of the PTO shaft 22. In this regard the provision of the bar 40 enables the lock members of the rearwardly disposed socket assemblies 30 and 31 to be pivoted in unison to facilitate rapid operation. Similar means could be connected between the lock members of the forwardly disposed socket assemblies 28 and 29, if desired.

From the foregoing it will be appreciated that the combined hitch and power train coupling assembly of the invention facilitates quick and easy attachment of implements to the tractor. Various changes falling within the scope and spirit of the invention will occur to those skilled in the art. The invention is therefore not to be thought of as limited to the specific embodiment set forth.

What is claimed is:

1. A combination plural hitch and power train coupling assembly for a tractor, said assembly comprising;
    a support adapted to be mounted on said tractor;
    a power transmission shaft carried on said support forming a portion of said power train and having plural power-output ends;
    and hitch means on said support adapted for coupling associated implements to said tractor, said hitch means being disposed proximate to respective power-output ends of said shaft and serving to align power train portions of the respective implements with the respective power-output ends attendant to coupling of the implements with said hitch means to facilitate connection and disconnection of the implements with said tractor and power train.

2. The subject matter of claim 1, in which said support includes plate means and said shaft being journaled through said plate means, said hitch means including implement-receiving socket means secured to said plate means and extending from opposite sides thereof proximate to the plural power-output ends respectively.

3. The subject matter of claim 1, in which said hitch means includes first and second pairs of implement-receiving socket means extending forwardly and rearwardly respectively from said support, and further including latch means on each of said socket means for locking the respective implements in the respective pairs of socket means.

4. The subject matter of claim 3, in which each of said socket means includes a flange having portions vertically spaced to define an open ended slot therebetween, said latch means including a lock member pivotally secured to said flange and extending at least partially across said slot when pivotally disposed in one position to define an implement-receiving area therewith, and biasing means on said lock member resiliently holding said lock member in said one position while permitting the lock member to be pivoted against the force of said biasing means into a second position facilitating coupling of the implement in said slot.

5. The subject matter of claim 1, and the combination of a tractor having means mounting said support in downwardly depending relation with said shaft disposed in parallel relation to the longitudinal extent of said tractor so that one of said power-output ends extends forwardly and the other extends rearwardly, whereby the implements are adapted to be positioned forwardly and rearwardly of said support in spaced relation longitudinally of the tractor.

6. The subject matter of claim 5, in which said hitch means includes implement-receiving socket means extending forwardly and rearwardly from said support proximate to said forwardly and rearwardly extending power-output ends respectively.

7. A combination plural hitch and power train coupling assembly for a tractor having an engine including a pulley rotatable on a substantially horizontal axis and providing a power-output at the forward end of the tractor, said assembly comprising:
   a support depending from said tractor;
   a power transmission shaft carried on said support in parallel relation to said horizontal axis and having forwardly and rearwardly extending power-output ends;
   pulley means on said shaft intermediate said output ends;
   drive belt means rotatably coupling said pulley and said pulley means for conjoint rotation;
   and hitch means on said support for coupling associated implements to said tractor, said hitch means being disposed proximate to said forwardly and rearwardly extending power-output ends respectively and serving to align power train portions of the respective implements with the respective power-output ends attendant to coupling of the implements with their respective hitch means to facilitate connection and disconnection of the implements with said tractor in longitudinally spaced relation of the tractor.

8. The subject matter of claim 7, in which said hitch means includes first and second pairs of implement-receiving socket means extending forwardly and rearwardly respectively from said support, and further including latch means on each of said socket means for locking the respective implements in the respective pairs of socket means.

9. The subject matter of claim 7, in which said support includes plate means extending transversely of the tractor, said shaft being journaled through said plate means, said hitch means including first and second pairs of implement-receiving socket means secured to said plate means and extending forwardly and rearwardly therefrom respectively proximate to said forwardly and rearwardly extending power-output ends respectively.

10. The subject matter of claim 9, in which said hitch means includes latch means mounted on each of said socket means for locking the respective implements in the respective pairs of socket means.

References Cited

UNITED STATES PATENTS 2,618,979   11/1952   Benning _____ 74—15.63 X
3,349,631   10/1967   Schlapman et al. ____ 74—15.63

FRED C. MATTERN, JR., *Primary Examiner.*

LEONARD H. GERIN, *Assistant Examiner.*